United States Patent
Pattar et al.

(10) Patent No.: US 10,061,951 B2
(45) Date of Patent: Aug. 28, 2018

(54) METHODS AND SYSTEMS FOR LOCALIZING ARTICLES COMPRISING PASSIVE RADIO FREQUENCY IDENTIFICATION (RFID) TAGS

(71) Applicant: Wipro Limited, Bangalore (IN)

(72) Inventors: Adarsh Pattar, Bijapur (IN); Surendran Rajendran, Chennai (IN); Ganeshan Kailasam, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/409,652

(22) Filed: Jan. 19, 2017

(65) Prior Publication Data

US 2018/0150664 A1 May 31, 2018

(30) Foreign Application Priority Data

Nov. 30, 2016 (IN) .............................. 201641040979

(51) Int. Cl.
| | |
|---|---|
| *G08B 13/14* | (2006.01) |
| *G06K 7/10* | (2006.01) |
| *G01S 3/02* | (2006.01) |
| *G06Q 10/08* | (2012.01) |
| *B64D 11/00* | (2006.01) |
| *G06K 17/00* | (2006.01) |

(52) U.S. Cl.
CPC ............ G06K 7/10386 (2013.01); G01S 3/02 (2013.01); G06K 7/10376 (2013.01); G06Q 10/087 (2013.01); *B64D 11/00* (2013.01); *G06K 2017/0051* (2013.01)

(58) Field of Classification Search
CPC ................................. G06K 1/00; G06G 10/00
See application file for complete search history.

(56) References Cited

U.S. PATENT DOCUMENTS

| | | | |
|---|---|---|---|
| 7,551,086 B2 | 6/2009 | Coop et al. | |
| 9,162,776 B2 | 10/2015 | Shore et al. | |
| 2007/0229268 A1 | 10/2007 | Swan et al. | |
| 2007/0232164 A1* | 10/2007 | Swan ........................ B63C 9/20 | |
| | | | 441/108 |
| 2011/0133891 A1* | 6/2011 | Krug ..................... G06K 7/0008 | |
| | | | 340/10.1 |
| 2014/0210598 A1 | 7/2014 | Mitchell et al. | |

* cited by examiner

*Primary Examiner* — Shirley Lu
(74) *Attorney, Agent, or Firm* — LeClairRyan PLLC

(57) ABSTRACT

A method of localizing articles comprising passive Radio Frequency Identification Device (RFID) tags is disclosed. The method includes receiving tag information from each of a plurality of RFID tags attached to a plurality of articles fixed to a plurality of immovable assets disposed in a predefined layout within an enclosed region; segregating the tag information received from each of the plurality of RFID tags into a plurality of regions within the predefined layout; mapping an RFID tag from the plurality of RFID tags to an immovable asset from the plurality of immovable assets; and verifying mapping of the RFID tag to the immovable asset based on an estimated physical location of the RFID and an actual physical location of the RFID tag.

18 Claims, 5 Drawing Sheets

METHODS AND SYSTEMS FOR LOCALIZING ARTICLES COMPRISING PASSIVE RADIO FREQUENCY IDENTIFICATION (RFID) TAGS

This application claims the benefit of Indian Patent Application Serial No. 201641040979 filed Nov. 30, 2016, which is hereby incorporated by reference in its entirety.

FIELD

This disclosure relates generally to localizing articles and more particularly to methods and systems for localizing articles comprising passive Radio Frequency Identification Device (RFID) tags.

BACKGROUND

Airplanes are designed for long haul and in order to ensure safety of passengers during the course of flight, airplanes are equipped with various safety equipment for passengers, for example, a life vests, oxygen masks, and floats. One of the important goals of aircraft cabin crew before an airplane takes off, is to validate that each safety equipment is in its designated place. For example, each chair in the airplane has a life vest placed underneath for an emergency landing situation.

Conventionally, just before an aircraft takes-off, the aircraft cabin crew manually validates presence of safety equipment for each passenger. This approach of validating presence of safety equipment in the aircraft is not only time consuming, but laborious as well. In other conventional systems, each of these safety equipment has an associated passive RFID tag. However, in these conventional systems, the use of passive RFID tags reduces the detection range. Moreover, due to reflection, multi path effect and less distance between two neighboring chairs, multiple RFID tags may be detected in one chair, or a single tag may be detected in multiple chairs/Rows.

SUMMARY

In one embodiment, a method of localizing articles comprising passive Radio Frequency Identification Device (RFID) tags. The method includes receiving, by an RFID platform, tag information from each of a plurality of RFID tags attached to a plurality of articles, the plurality of articles being fixed to a plurality of immovable assets disposed in a predefined layout within an enclosed region, wherein the RFID platform is automatically oriented based on the predefined layout to receive tag information from each of the plurality of RFID tags; segregating, by the RFID platform, the tag information received from each of the plurality of RFID tags into a plurality of regions within the predefined layout based on the tag information, physical dimensions of each of the plurality of immovable assets, and a physical location of each of the plurality of immovable assets within the enclosed region; mapping, by the RFID platform, an RFID tag from the plurality of RFID tags to an immovable asset from the plurality of immovable assets, based on a detection count of the RFID tag at a physical location of the immovable asset and total number of detection counts for a set of RFID tags from the plurality of RFID tags, at the physical location of the immovable asset, in response to segregating the tag information; and verifying, by the RFID platform, mapping of the RFID tag to the immovable asset based on an estimated physical location of the RFID tag and an actual physical location of the RFID tag.

In another embodiment, an RFID platform for localizing articles comprising passive RFID tags is disclosed. The RFID platform comprises an RFID reader configured to receive tag information from each of a plurality of RFID tags attached to a plurality of articles, the plurality of articles being fixed to a plurality of immovable assets disposed in a predefined layout within an enclosed region, wherein the RFID reader is automatically oriented based on the predefined layout to receive tag information from each of the plurality of RFID tags; and an analytics engine communicatively coupled to the RFID reader, the analytics engine being configured to: segregate the tag information received from each of the plurality of RFID tags into a plurality of regions within the predefined layout based on the tag information, physical dimensions of each of the plurality of immovable assets, and a physical location of each of the plurality of immovable assets within the enclosed region; map an RFID tag from the plurality of RFID tags to an immovable asset from the plurality of immovable assets, based on a detection count of the RFID tag at a physical location of the immovable asset and total number of detection counts for a set of RFID tags from the plurality of RFID tags, at the physical location of the immovable asset, in response to segregating the tag information; and verify the mapping of the RFID tag to the immovable asset based on an estimated physical location of the RFID tag and an actual physical location of the RFID tag.

In yet another embodiment, a non-transitory computer-readable storage medium is disclosed. The non-transitory computer-readable storage medium having stored thereon, a set of computer-executable instructions for localizing articles comprising passive RFID tags causing a computer comprising one or more processors to perform steps comprising receiving, by an RFID platform, tag information from each of a plurality of RFID tags attached to a plurality of articles, the plurality of articles being fixed to a plurality of immovable assets disposed in a predefined layout within an enclosed region, wherein the RFID platform is automatically oriented based on the predefined layout to receive tag information from each of the plurality of RFID tags; segregating, by the RFID platform, the tag information received from each of the plurality of RFID tags into a plurality of regions within the predefined layout based on the tag information, physical dimensions of each of the plurality of immovable assets, and a physical location of each of the plurality of immovable assets within the enclosed region; mapping, by the RFID platform, an RFID tag from the plurality of RFID tags to an immovable asset from the plurality of immovable assets, based on a detection count of the RFID tag at a physical location of the immovable asset and total number of detection counts for a set of RFID tags from the plurality of RFID tags, at the physical location of the immovable asset, in response to segregating the tag information; and verifying, by the RFID platform, mapping of the RFID tag to the immovable asset based on an estimated physical location of the RFID tag and an actual physical location of the RFID tag.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
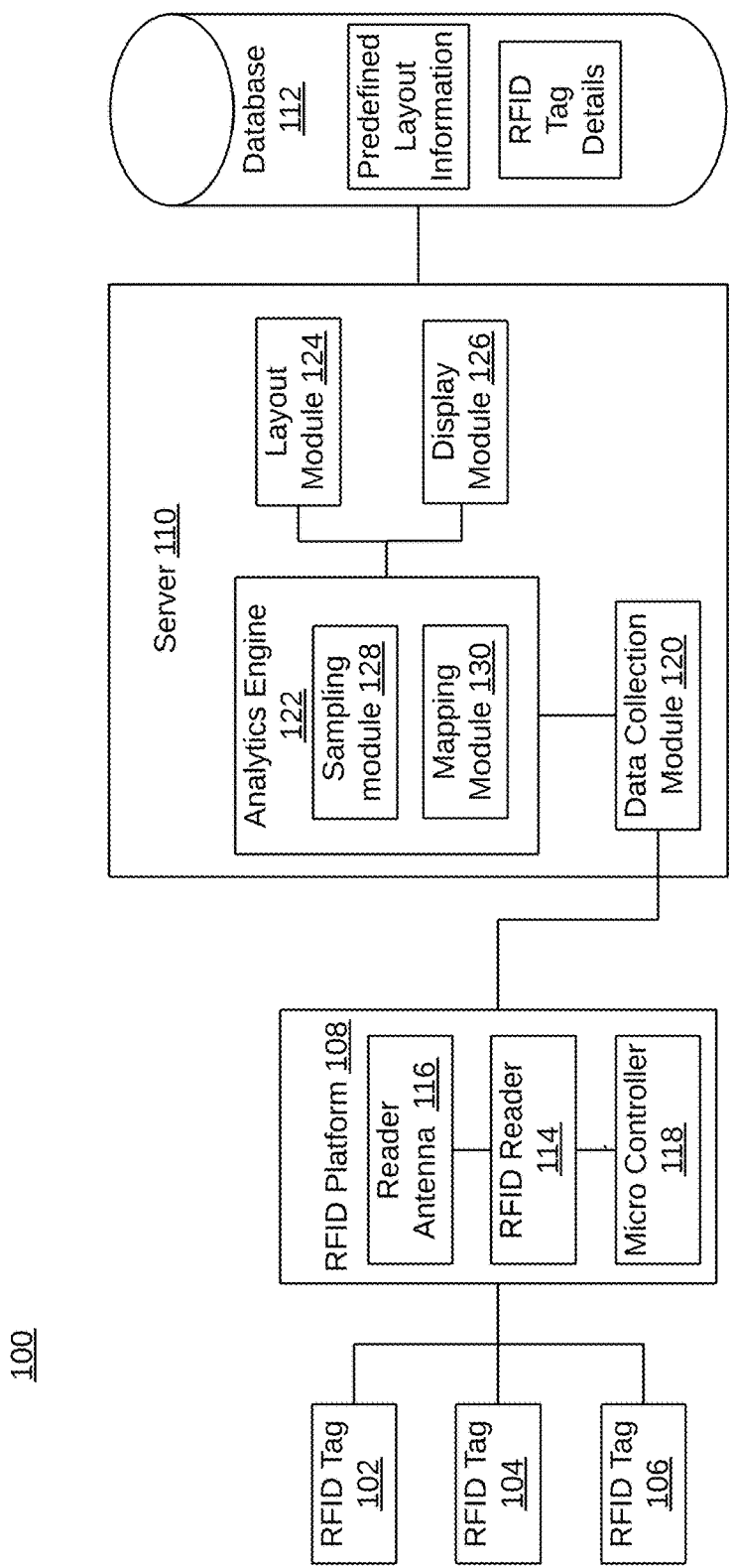
FIG. 1 is a diagram illustrating a system for localizing articles comprising Radio Frequency Identification Device (RFID) tags within an enclosed region, in accordance with an embodiment.

Additional illustrative embodiments are listed below. In one embodiment, a block diagram of a system 100 for localizing articles comprising Radio Frequency Identification Device (RFID) tags within an enclosed region is illustrated in FIG. 1. The enclosed region within which the articles are localized may include a cabin within a vehicle (for example, an aircraft, a submarine, a ship, a boat, a car, a train, and a bus) or a storage area within a warehouse. It will be apparent to a person skilled in the art that the enclosed region is not limited to the examples given above. When the enclosed region is the cabin of a vehicle, examples of the articles may include, but are not limited to life vests, oxygen masks, airbags, floats, escape suits, and parachutes. In case of the storage area within a warehouse, examples of the articles may include any type of inventory that requires localization.

System 100 includes a plurality of RFID tags (for example, an RFID tag 102, an RFID tag 104, and an RFID tag 106) that are passive RFID tags, an RFID platform 108, a server 110, and a database 112. A passive RFID tag is an identification device that is used for the purpose of identification and tracking and operates on Ultra High Frequency (UHF) range. Each passive RFID tag is attached to an article. In other words, the article may be identified and tracked using the passive RFID tag attached to it.

The article is further fixed, permanently or temporarily, to the immovable asset, such that, in some cases the article can be detached from the immovable asset. In case of vehicles, examples of the immovable asset may include, but are not limited to chairs, oxygen mask compartment, a lifeboat compartment, escape suit compartment, and airbag compartments. In case of a warehouse, examples of the immovable asset may include, but are not limited to shelves in a storage area within the warehouse and racks.

Each of RFID tag 102, RFID tag 104, and RFID tag 106 is separately attached to different articles. By way of an example, when life vest are being localized within an aircraft, RFID tag 102 may be attached to a first life vest, RFID tag 104 may be attached to a second life vest, and RFID tag 106 may be attached to a third life vest. Each of the first, second, and third life vests are further attached to a chair in the cabin of the aircraft. Thus, in this example, RFID tags are used to map location of life vests to chairs in the aircraft.

To this end, RFID platform 108 performs a scan to receive tag information from the plurality of RFID tags. RFID platform 108 may be a wireless portable device. RFID platform 108 includes an RFID reader 114, which may be a UHF reader capable of receiving tag information from passive RFID tags. The tag information received from an RFID tag will include, but is not limited to unique ID of the RFID tag, and a Received Signal Strength Indicator (RSSI) of a backscatter signal received from the RFID tag.

RFID reader 114 initiates detection of RFID tags and reception of the tag information through a reader antenna 116, which may be a UHF antenna. RFID reader 114 and the plurality of RFID tags communicate with each other via air interface protocol, which is facilitated by reader antenna 116. In an exemplary embodiment, when RFID reader 114 is a UHF reader, the read range for RFID reader 114 may be up to 2-3 meters. Reader antenna 116 used by RFID reader 114 sends power as well as and commands to the RFID tags. Reader antenna 116 may operate at various range of frequencies that may include, but are not limited to low frequency, medium frequency, high frequency, and ultrahigh frequency. In an exemplary embodiment, RFID antenna 116 is a UHF antenna that operates on frequency range of 840-950 MHZ. While collecting the tag information, RFID reader 114 also captures its power at the time of detecting an RFID tag and a time stamp of detecting the RFID tag.

RFID reader 114 initiates the detection process in response to a command received from a micro controller 118. Micro controller 118 is a local processing unit in RFID platform 108 that also stores the tag information received by RFID reader 114 in a local file. Micro controller 118 communicates the tag information to server 110 through a Wi-Fi interface. It will apparent to a person skilled in the art that the invention is not limited to a Wi-Fi interface and other wired and wireless interfaces may also be used.

Server 110 is the central processing and analytic unit in system 100 that analyzes the tag information received from micro controller 118 and information received from a database 112. Database 112 is a central storage unit that includes a predefined layout information for the plurality of immovable assets within the enclosed region. By way of an example, when the enclose region is a cabin of an aircraft, the predefined layout information may include number of rows, number of aisles per row, number of chair on either side of the aisle, and size of each chair inside the cabin. Database 112 further stores RFID tag details for each of the plurality of RFID tags. RFID tag detail for an RFID tag may include, but is not limited to a unique ID of the RFID tag, type of an article mapped to that unique ID, and expiry date of the article.

To analyze information received from micro controller 118 and database 112, server 110 includes a data collection module 120, an analytics engine 122, a layout module 124, and a display module 126. Data collection module 120 collects the tag information received from micro controller 118 and information received from database 112. The collected information is then communicated to analytics engine 122, which further includes a sampling module 128 and a mapping module 130. By way of example only, the analytics engine 122 may comprise programmed instructions within a memory in an analytics computing server or apparatus, such as server 110 by way of example only, that comprises the memory coupled to a processor which is configured to execute programmed instructions stored in the memory as illustrated and described by way of the examples herein. Sampling module 128 segregates the tag information received into a plurality of regions within the predefined layout based on: the tag information, physical dimensions of each of the plurality of immovable assets, and a physical location of each of the plurality of immovable assets within the enclosed region. The data related to the physical dimensions of immovable assets and physical location of immovable assets is received from layout module 124. The physical dimensions of the immovable asset include a width, a height, a length, or a thickness of the immovable asset. This is further explained in conjunction with FIGS. 2 and 3.

Thereafter, in response to segregating of the tag information, mapping module 130 uses the segregated tag information to map an RFID tag from the plurality of RFID tags to an immovable asset from the plurality of immovable assets. This mapping is done based on a detection count of the RFID tag at a physical location of the immovable asset and total number of detection counts for a set of RFID tags from the plurality of RFID tags at the physical location of the immovable asset. This is further explained in detail in conjunction with FIGS. 2 and 3.

Mapping module 130 then verifies mapping of the RFID tag to the immovable asset based on an estimated physical location of the RFID tag and an actual physical location of the RFID tag. Thereafter, display module 126 displays a result of the verification. The result may be that an immovable asset includes zero, a single, or multiple articles. By way of an example, in case of life vests within an aircraft, display module 126 will display mapping of a life vest to a chair along with coordinates of the life vest. Display module 126 will also highlight those chairs that do not have any life vest mapped to them and those chairs that have multiple life vest mapped to them. As a result of this, localization of life vests within the cabin of the aircraft is achieved.

It will be apparent to a person skilled in the art that various modules in server 110 may be part of RFID platform 108. In that case, system 100 will not include server 110 and RFID platform 108 would directly communicate with database 112.

Figure 2:
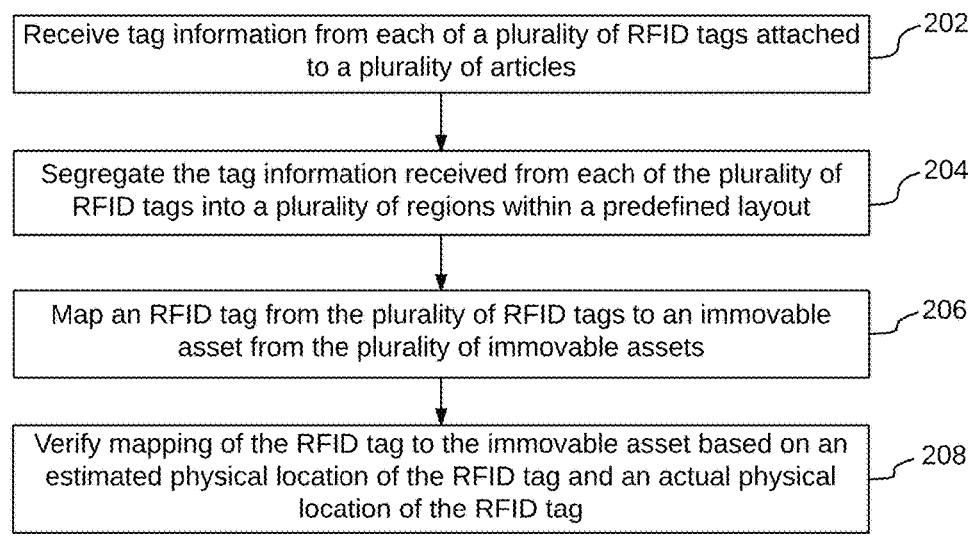
FIG. 2 illustrates a flowchart of a method for localizing articles comprising RFID tags within an enclosed region, in accordance with an embodiment.

Referring now to FIG. 2, a flowchart of a method for localizing articles comprising RFID tags within an enclosed region is illustrated, in accordance with an embodiment. At 202, RFID platform 108 receives tag information from each of a plurality of RFID tags attached to a plurality of articles. The tag information received from an RFID tag may include, but is not limited to a unique ID of the RFID tag, a RSSI of a backscatter signal received from the RFID tag. The plurality of articles are fixed to a plurality of immovable assets disposed in a predefined layout within an enclosed region. By way of an example, in case of an aircraft, an RFID tag is attached to a life vest (an article) which is further attached to a chair (immovable asset) in the aircraft. Multiple such chairs are disposed within the aircraft cabin (enclosed region) based on a predefined layout. Different aircraft models have different chair layouts, thus, it is essential to determine the chair layout specific to an aircraft model. Thereafter, RFID platform 108 can be properly configured to scan each RFID tag and receive the tag information.

Based on the predefined layout, RFID platform 108 is automatically oriented to receive tag information from each of the plurality of RFID tags. RFID platform 108 may be a wireless portable device that automatically moves and orients itself within the enclosed region based on the predefined layout of the immovable assets, such that, RFID platform 108 at least scans all desired RFID tags. In continuation of the aircraft example above, when RFID tags attached to life vests in chairs are to be scanned, RFID platform 108 moves automatically along an aisle of the aircraft, such that, RFID platform 108 stops at a predetermined distance before the point where a row starts and scans all desired RFID tags placed in that row.

When RFID platform 108 stops to scan RFID tags placed in a row, reader antenna 114 of RFID platform 108 scans the row by automatically sweeping 180 degrees starting from left to right side of the aisle with power of RFID reader 114 controlled in such a way that lower power is fed to sections near the RFID platform 108, medium power is fed to middle section, and higher power is fed to last section of the row. During this scanning process, direction of reader antenna 114 is kept in the line of sight of the chairs. While performing the scan, RFID reader 114 also captures its power at the time of detecting an RFID tag and a time stamp of detecting the RFID tag. This is further explained in detail in conjunction with the exemplary embodiment given in FIG. 5.

After collecting the tag information from the plurality of tags, the tag information received from each of the plurality of RFID tags is segregated into a plurality of regions within the predefined layout, at 204, by RFID platform 108. In case of an aircraft, a row wise segregation of the tag information is performed first. Thereafter, each chair is divided into 'N' distinct region, using which, the total number of such distinct regions is determined for one row in the aircraft. The tag information is then segregated based on these distinct regions in one row. This is further explained in detail in conjunction with FIG. 5.

The segregation is performed based on the tag information, physical dimensions of each of the plurality of immovable assets, and a physical location of each of the plurality of immovable assets within the enclosed region. The physical dimensions of the immovable asset include a width, a height, a length, or a thickness of the immovable asset. By way of an example, in case of life vests in an aircraft, segregation of data is based on the tag information, width of chairs, and coordinates of each chair in the aircraft cabin. The width of each chair and their coordinates are determined based on the cabin layout information stored in database 112. The segregation of data is further explained in conjunction with exemplary embodiment of FIG. 5.

After the tag information is segregated into a plurality of regions, RFID platform 108 maps, at 206, an RFID tag from the plurality of RFID tags to an immovable asset from the plurality of immovable assets. By way of an example, in case of life vests in an aircraft, an RFID tag is mapped to a chair. The mapping is done based on a detection count of the RFID tag at a physical location of the immovable asset and total number of detection counts for a set of RFID tags from the plurality of RFID tags at the physical location of the immovable asset. In continuation of the example given above, for detecting life vests in an aircraft, an RFID tag (attached to a life vest) is mapped to a chair based on number of time the RFID tag is detected at the physical location of the chair, total number of RFID tag detections at the physical location of the chair. This scenario is further explained in detail in conjunction with FIG. 3 and FIG. 5's exemplary embodiment.

Thereafter, RFID platform 108 estimates a physical location of the RFID tag based on detection counts of the RFID tag at each region within the physical dimension of the immovable asset, and physical location of each region within the physical dimension of the immovable asset. In continuation of the aircraft example given above, the physical location of the RFID tag attached to a life vest is estimated in coordinates. A chair (immovable asset in this case) is divided into three regions, i.e., two extreme ends and the center of the chair. These regions are represented as coordinates. The physical location of the RFID tag is estimated using detection count of the RFID tag at each of these multiple regions in the chair and coordinates of each of these three regions. This is further explained in detail in conjunction with the exemplary embodiment given in FIG. 5.

At 208, RFID platform 108 verifies the mapping of the RFID tag to the immovable asset based on the estimated physical location of the RFID tag and an actual physical location of the RFID tag. The actual physical location of the RFID tag may be retrieved from the RFID tag details stored in database 112. The mapping may be verified by comparing the physical dimension of the immovable asset with Euclidean distance between the estimated location of the RFID tag and the actual physical location of the RFID tag. When the Euclidean distance is greater than the physical dimension of the immovable asset, then the mapping of the RFID tag to the immovable asset is wrong. On the contrary, when the Euclidean distance is less than the physical dimension of the immovable asset, the mapping of the RFID tag to the immovable asset is correct. By way of an example, in case of life vests fixed to chairs in an aircraft, the width of a chair is compared with Euclidean distance between the estimated physical location of the RFID tag and the actual location of the RFID tag. If the Euclidean distance is greater than the width of the chair, it would mean that the estimated location is outside the width of the chair and the RFID tag is thus incorrectly mapped. However, if the Euclidean distance is less than the width of the chair, it would mean that the estimated location is within the width of the chair and the RFID tag is thus correctly mapped.

The system facilitates automatic data capture and analysis across an enclosed region (for example, vehicle cabin in an airplane) while using a single reader-antenna. The 180 sweep of the reader antenna at predetermined locations across the entire enclosed region ensures that all RFID tags are scanned. Moreover, as the whole process is automatic, time consumption in capturing tag information and thereafter localizing RFID tags is less compared to manual scanning. The system is efficient and results in localization to co-ordinates of each RFID tag within an immovable asset (for example, a chair), and thus accurately detects missing, duplicate/multiple tags in one immovable asset. The system also does not require any reference RFID tags for the localization process.

Figure 3:
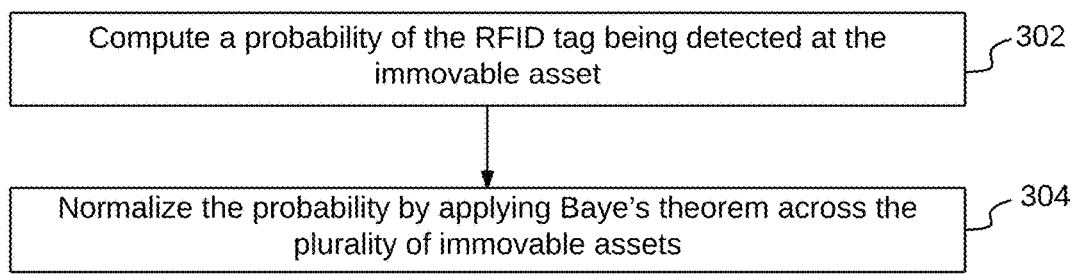
FIG. 3 illustrates a flowchart of a method for mapping an RFID tag to an immovable asset, in accordance with an embodiment.

Referring now to FIG. 3, a flowchart of a method for mapping an RFID tag to an immovable asset is illustrated, in accordance with an embodiment. Referring to 206 in FIG. 2, in order to map an RFID tag to an immovable asset, RFID platform 108, at 302, computes a probability of the RFID tag being detected at the immovable asset based on a detection count for the RFID tag on the physical location of the immovable asset and the total number of detection counts for various RFID tags on the physical location of the immovable asset. By way of an example, in case of life vests attached to chairs in an aircraft, the probability of detecting an RFID tag on a chair is computed based on detection count of the RFID tag on the physical location of the chair and the total number of detection counts of various RFID tags on the physical location of the chair. Thereafter, at 304, RFID platform 108 normalizes the probability by applying Baye's theorem across the plurality of immovable assets. In continuation of the example given above, the probability is normalized across all the chairs in the aircraft. This is further explained in detail in conjunction with exemplary embodiment of FIG. 5.

Figure 4:
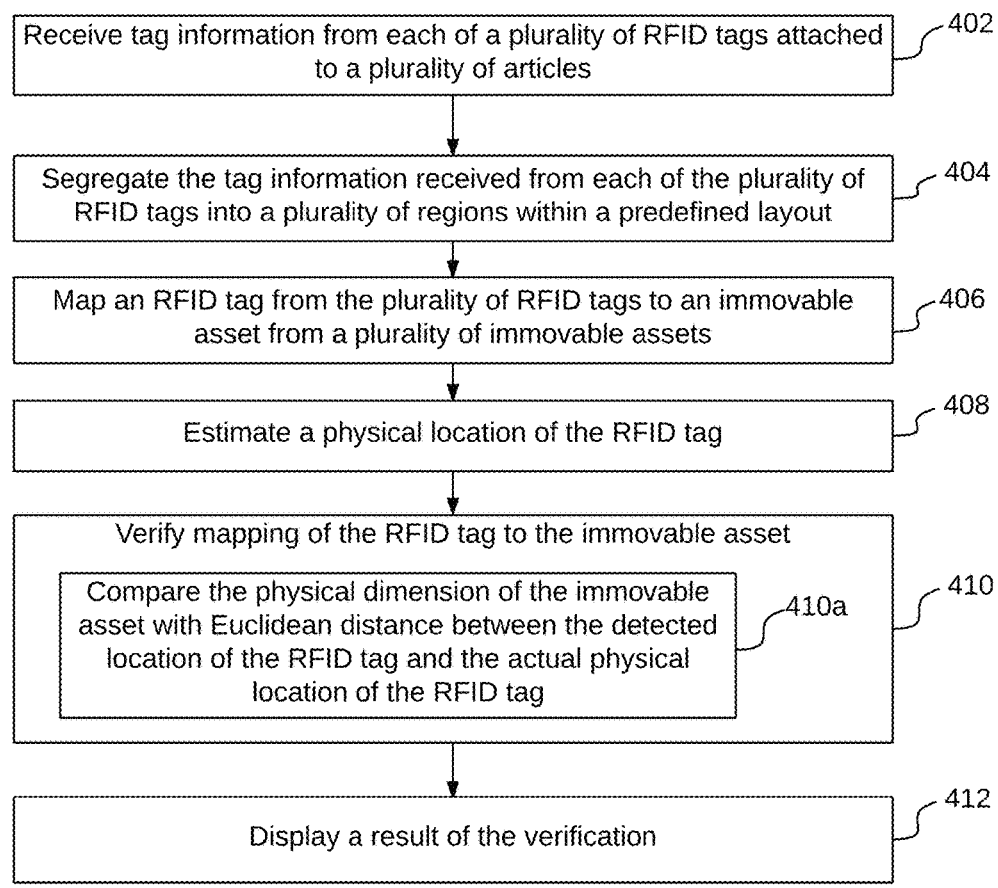
FIG. 4 illustrates a flowchart of a method for localizing articles comprising RFID tags within an enclosed region, in accordance with another embodiment.

Referring now to FIG. 4, a flowchart of a method for localizing articles comprising RFID tags within an enclosed region is illustrated, in accordance with another embodiment. At 402, tag information is received from each of a plurality of RFID tags attached to a plurality of articles. At 404, the tag information received from each of the plurality of RFID tags is segregated into a plurality of regions within a predefined layout of an enclosed region. At 406, an RFID tag from the plurality of RFID tags is mapped to an immovable asset from the plurality of immovable assets. This has been explained in detail in conjunction with FIGS. 2 and 3.

Thereafter, at 408 a physical location of the RFID tag is estimated. At 410, mapping of the RFID tag to the immovable asset is verified. To verify, at 410a, the physical dimension of the immovable asset is compared with Euclidean distance between the detected location of the RFID tag and the actual physical location of the RFID tag. A result of the verification is then displayed at 412. This has been explained in detail in conjunction with FIG. 2.

Figure 5:
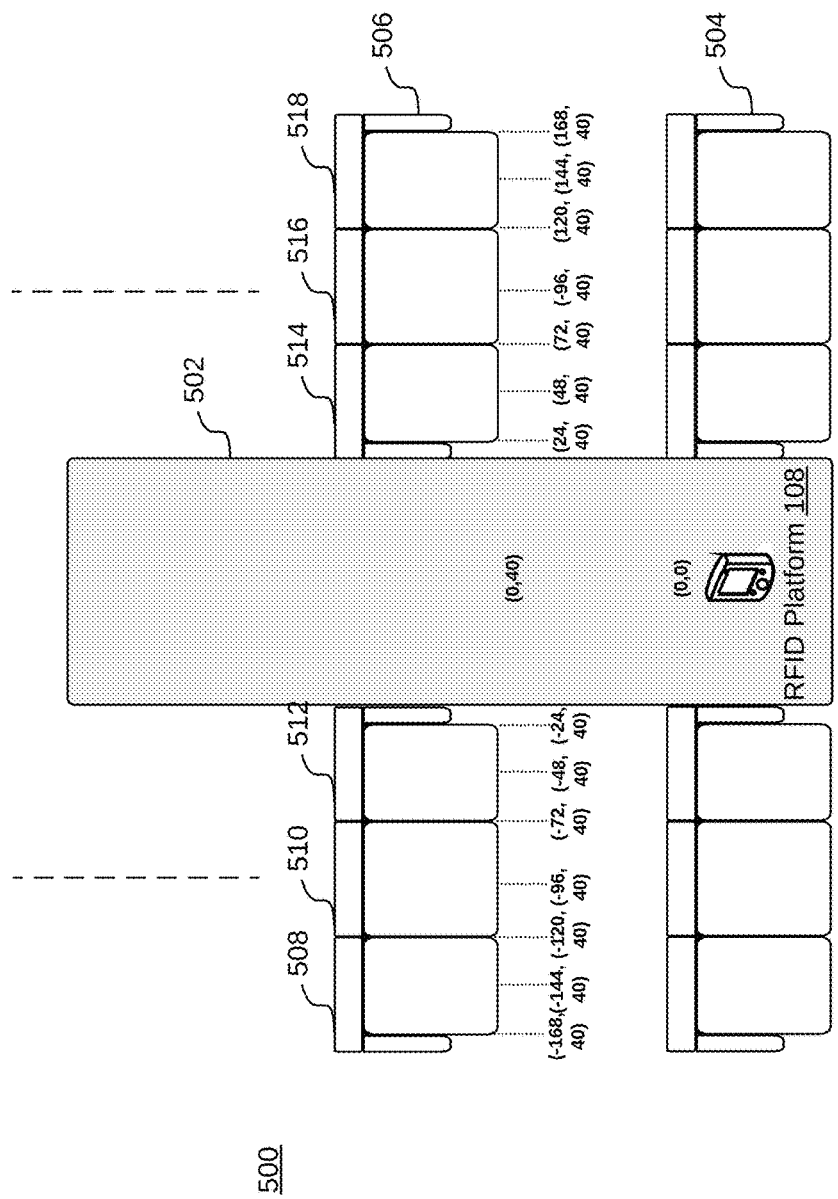
FIG. 5 illustrates localizing of life vests that include passive RFID tags within a cabin of an aircraft, in accordance with an exemplary embodiment.

Referring now to FIG. 5, localizing of life vests that include passive RFID tags within a cabin 500 of an aircraft is illustrated, in accordance with an exemplary embodiment. Cabin 500 includes several chairs that are arranged in rows based on a cabin layout specific to the aircraft. It will be apparent to a person skilled in the art that only two rows of cabin 500 are depicted in FIG. 5. Each row in cabin 500 includes six chairs that are divided into two sets of three chairs by an aisle 502. In other words, for each row, there are three chairs on either side of aisle 502. Each chair includes a life vest (not shown) fixed to it, which further has a passive RFID tag attached therein.

To localize life vests in cabin 500 of the aircraft, RFID platform 108 automatically moves along the center of aisle 502 while scanning passive RFID tags in each row. As the passive RFID tags are placed under the chairs, reader antenna 116 is angled to be at the line of sight of the chairs. After RFID platform 108 has scanned a first row 504, RFID platform 108 stops for a predefined time period at a point where first row 504 ends in order to scan a second row 506. In this exemplary embodiment, the coordinates of this point are (0,0). On the left side of aisle 502, second row 506 includes a chair 508, a chair 510, a chair 512 and on the right side of aisle 502, second row 506 includes a chair 514, a chair 516, and a chair 518. For each chair in second row 506, extreme coordinates and central coordinates are depicted in FIG. 5. For each of these chairs, location of a passive RFID tag may be at the central coordinates.

After reaching the point where first row 504 ends, RFID reader 114 starts scanning second row 506 by sweeping reader antenna 116 along an angle of 180 degrees starting from the left side of aisle 502 and moving to the right side of aisle 502 with power of RFID reader 114 controlled in such a way that lower power is fed to chairs 512 and 514, medium power is fed to chairs 510 and 516, and higher power is fed to chairs 508 and 518. The passive RFID tags attached to each life vest gets activated by power of RFID reader 114 and backscatter tag information to RFID reader 114 via air interface protocol. RFID reader 114 collects the tag information and stores it in micro controller 118. The process of sweeping reader antenna 116 along an angle of 180 degrees in each row and collecting tag information has a higher probability of detecting passive RFID tag for most of the tag orientations, when compared to collecting the tag information by keeping reader antenna 116 static at point. RFID reader 114 repeats this for each row in cabin 500 and receives tag information from a plurality of passive RFID tags.

Thereafter, a row wise segregation of the tag information is performed. The segregation is performed based on the tag information, width of chairs, and coordinates of each chair in cabin 500. The row wise segregation of data is performed using time stamps associated with scanning of each row in cabin 500 by RFID platform 108. In an exemplary embodiment, when RFID platforms 108 takes a time of 'T1' seconds to scan one row in cabin 500, the total time taken by RFID platform 108 to scan all rows in cabin 500 can be computed using the equation (1):

$$T=((T1+\delta)*\text{Number of rows}) \quad (1)$$

where,

T is the total time taken in seconds to scan all rows,
T1 is time taken in seconds to scan one row,
δ is time taken by RFID platform 108 to move to the next row In this exemplary embodiment, row wise segregated tag information may thus be represented by the equation (2):

$$\text{Tag Information/row}=(T/\text{Number of rows})-\delta \quad (2)$$

After getting row wise segregated tag information, it is grouped based on multiple distinct regions in a row. Each of these multiple distinct regions in a row are the actual coordinates of chairs in that row. Each chair may be divided into 'N' distinct regions and the coordinates of each of these "N" distinct regions for each chair is retrieved from layout module 124. The major characteristic considered in grouping the row wise segregated information into multiple distinct regions in a row, is the total detection count of each passive RFID tag in a distinct region. The number of multiple distinct points in the row are calculated using the equation (3):

$$\text{Multiple distinct regions in a row}=[(\text{width of a chair})\times(\text{number of chair in row})]/\text{'N' distinct regions of a chair} \quad (3)$$

In second row 506, each chair has three distinct regions and coordinates for each of these distinct regions are depicted in FIG. 5. Though, the total number of distinct regions in the second row 506 should be: six (number of chairs)*3 (number of distinct regions for each chair)=18. However, as eight of these distinct regions overlap to form four distinct regions, the actual number of distinct regions in second row 506 for chairs 508-518 is 14. Multiple distinct regions in second row 506 when calculated using the equation given above will also give 14 as the result.

After row wise segregated tag information for second row 506 is grouped based on multiple distinct regions in second row 506, RFID platform 108 maps a passive RFID tag of a life vest to a chair in second row 506. A passive RFID tag is mapped to a chair based on number of times the passive RFID tag is detected at the physical location of the chair and the total number of passive RFID tag detections at the physical location of the chair.

Further, determining total detection count of each passive RFID tag in each region of each chair in second row 506, RFID platform 108 calculates a probability of detecting a passive RFID tag in a given chair of second row 506. The probability of a passive RFID tag 'x' being located in chair 510 (for example) is calculated using the equation (4):

$$P(x/\text{chair 510})=(\text{Detection count of 'x' in chair 510})/ \\ (\text{Sum of total count of every passive RFID tag detected in chair 510}) \quad (4)$$

Calculating the probability provides probable existence of a passive RFID tag in a given chair. Due to high detection count, the probability of detecting a passive RFID tag in its actual position will be high as compared to probabilities for all other passive RFID tags. This will further help in finding out passive RFID tags that are detected because of reflection from the walls or passive RFID tags that are detected from neighboring rows and chair.

Thereafter, Baye's theorem is applied to normalize the probability calculation of mapping of each passive RFID tag to a respective chair in second row 506. Each passive RFID tag may be detected with varied probabilities at the physical location of the chair it is actually attached to and also at its neighboring chairs. The calculated probabilities for each passive RFID tag are normalized across every chair of every row in cabin 500. This normalization helps identifying the chair at which a given passive RFID tag will have maximum probability. Accordingly, RFID platform 108 maps a passive RFID tag to a chair that has maximum normalized probability for the passive RFID tag. The calculated probability for an RFID tag may be normalized using the equations (5) and (6):

$$P(A_i|x) = \frac{P(A_i)P(x/A_i)}{\sum_{j=1}^{N} P(A_j)P(x/A_j)} \quad (5)$$

where,

'$A_i$' is ID of a chair and is ID of a passive RFID tag detected at the chair '$A_i$,'

$P(A_i|x)$ is the probability that the chair '$A_i$' has the passive RFID tag 'x,'

$P(x/A_i)$ is the probability of the passive RFID tag 'x' in the chair $A_i$, $P(A_i)$ is the probability of occurrence of $i^{th}$ chair, $$P(A_0)=P(A_1)=---=P(A_{N-1}) \quad (6)$$

where,

N is the total number of chairs considered.

Mapping of a passive RFID tag to its respective chair using the above method enables elimination of sensing duplicate passive RFID tags in a single chair and of detecting the same passive RFID tags in multiple rows. This method also helps in detecting presence of multiple tags in one chair. This method also helps in eliminating tag detections from neighboring rows or due to reflection from side walls.

Based on mapping of a passive RFID tag to a chair in second row 506, the physical location (in coordinates) of the passive RFID tag is estimated. As explained before, each chair is divided into three regions, i.e., two extreme ends and the center of the chair. For second row 506, these regions are represented as coordinates. The physical location of the passive RFID tag is estimated using detection count of the passive RFID tag at each of these multiple regions in the chair and coordinates of each of these three regions. The leveled nearest neighbor algorithm represented in the equation (7) below is use to estimate the physical location of the passive RFID tag:

$$\text{Estimated Location of a passive } RFID \text{ tag } 'x' = \frac{\sum_{i=1}^{M}\sum_{j=1}^{N}(D_{ij} * Pos_{ij})}{\sum_{j=1}^{N} D_{ij}} \quad (7)$$

where, $D_{i1}, D_{i2}, \ldots D_{iN}$ are total detection count observed at all regions of chair 'i,'

$POS_{i1}, P_{osi2} \ldots Pos_{ij}$ are the N distinct known regions around chair 'i,'

'i' ranges from 1 to M, M being the total number of chairs in a row.

Using the equation given above, location of the passive RFID tag mapped to a chair is estimated in (X, Y) coordinates in that chair. Thereafter, RFID platform 108 verifies the mapping of the passive RFID tag to the chair based on the estimated physical location of the passive RFID tag and an actual physical location of the RFID tag (attached to a life vest). The actual physical location of the RFID tag may be retrieved from the RFID tag details stored in database 112. When the estimated location of the passive RFID tag is: (X, Y), the actual physical location of the passive RFID tag is: (X1, Y1), and width of a chair is: Z1. The verification may be done using the method given below:

---
Euclidean distance between (X, Y) and (X1,Y1)
If Euclidean distance > Z1,
  the passive RFID tag is mapped to the wrong chair,
Else if Euclidean distance < Z1,
  the passive RFID tag is mapped to the correct chair.

---

In other words, if the Euclidean distance is greater than the width of the chair, it would mean that the estimated location is outside the width of the chair and is thus incorrectly mapped. However, if the Euclidean distance is less than the width of the chair, it would mean that the estimated location is within the width of the chair and is thus correctly mapped. By way of an example, considering chair 510, whose width is 48 cm and a passive RFID tag that is mapped to chair 510. The physical location of the passive RFID tag attached to a life vest may be estimated as: (−110, 40) and the actual physical location of the passive RFID tag as retrieved from database 112 is (−90, 40). The Euclidean distance between these coordinates is computed using the equation: $\sqrt{[(-110)-(-90)]^2+[40-40]^2}$, and is computed as 20, which is less than 48 cm (width of the chair). Thus, the passive RFID tag is correctly mapped to chair 510.

The verification is done for mapping of every passive RFID tag to a respective chair in cabin 500. Thereafter, results of the verification are sent to display module 126, which then displays correct mapping of a life vest to a chair along with coordinates of the life vest. Display module 126 will also highlight those chairs that do not have any passive RFID tag mapped to them and those chairs that have multiple RFID tags mapped to them. As a result of this, localization of life vests within cabin 500 of the aircraft is achieved.

Various embodiments of the invention provide methods and systems for localizing articles comprising passive RFID tags. The system facilitates automatic data capture and analysis across an enclosed region (for example, vehicle cabin in an airplane) while using a single reader-antenna. The 180 sweep of the reader antenna at predetermined locations across the entire airplane ensure that all RFID tags are scanned. Moreover, as the whole process is automatic, time consumption in capturing tag information and thereafter localizing RFID tags is less compared to manual scanning. The system is very efficient, results in localization to co-ordinates of each RFID tag within a chair, and thus accurately detects missing, duplicate/multiple tags in one chair. The system also does not require any reference RFID tags for the localization process.

The specification has described methods and systems for localizing articles comprising passive RFID tags. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of localizing articles comprising passive Radio Frequency Identification Device (RFID) tags, the method comprising:

receiving, by an RFID platform, tag information from each of a plurality of RFID tags attached to a plurality of articles, the plurality of articles being fixed to a plurality of immovable assets disposed in a predefined layout within an enclosed region, wherein the RFID platform is automatically oriented based on the predefined layout to receive tag information from each of the plurality of RFID tags;

segregating, by the RFID platform, the tag information received from each of the plurality of RFID tags into a plurality of regions within the predefined layout based on the tag information, physical dimensions of each of the plurality of immovable assets, and a physical location of each of the plurality of immovable assets within the enclosed region;

mapping, by the RFID platform, an RFID tag from the plurality of RFID tags to an immovable asset from the plurality of immovable assets, based on a detection count of the RFID tag at a physical location of the immovable asset and total number of detection counts for a set of RFID tags from the plurality of RFID tags, at the physical location of the immovable asset, in response to segregating the tag information, wherein based on the mapping a missing passive RFID tag or a duplicate passive RFID tag associated with a plurality of articles is detected;

verifying, by the RFID platform, mapping of the RFID tag to the immovable asset based on an estimated physical location of the RFID tag and an actual physical location of the RFID tag; and displaying, by the RFID platform, a result of the verification, the result comprising one of each of the immovable assets mapped with a single article, each of the immovable assets mapped with multiple articles, or each of the immovable assets not mapped with an article.

2. The method of claim 1, further comprising estimating a physical location of the RFID tag based on detection counts of the RFID tag at each region within the physical dimension of the immovable asset, and physical location of each region within the physical dimension of the immovable asset.

3. The method of claim 1, wherein verifying comprises comparing the physical dimension of the immovable asset with Euclidean distance between the estimated location of the RFID tag and the actual physical location of the RFID tag.

4. The method of claim 3, wherein the Euclidean distance being greater than the physical dimension of the immovable asset indicates incorrect mapping of the RFID tag to the immovable asset.

5. The method of claim 3, wherein the Euclidean distance being less than the physical dimension of the immovable asset indicates correct mapping of the RFID tag to the immovable asset.

6. The method of claim 1, wherein the plurality of immovable assets comprises one of chairs, oxygen mask compartments, a lifeboat compartment, or airbag compartments.

7. The method of claim 1, wherein the plurality of articles comprises one of life vests, floats, oxygen masks, life boats, or airbags.

8. The method of claim 1, wherein receiving the tag information comprises capturing, by the RFID platform, an RFID reader power at time of detecting an RFID tag and a time stamp of detection of the RFID tag, and wherein the tag information received from the RFID tag comprises at least a unique ID of the RFID tag and a Received Signal Strength Indicator (RSSI) of a backscatter signal received from the RFID tag.

9. The method of claim 1, wherein the physical dimensions of the immovable asset comprise one or more of a width, a height, a length, or a thickness of the immovable asset.

10. The method of claim 1, wherein mapping the RFID tag to the immovable asset comprises:

computing a probability of the RFID tag being detected at the immovable asset based on a detection count for the RFID tag on the physical location of the immovable asset and the total number of detection counts for the set of RFID tags on the physical location of the immovable asset; and normalizing the probability by applying Baye's theorem across the plurality of immovable assets.

11. A Radio Frequency Identification Device (RFID) platform for localizing articles comprising passive RFID tags, the RFID platform comprising:

an RFID reader configured to receive tag information from each of a plurality of RFID tags attached to a plurality of articles, the plurality of articles being fixed to a plurality of immovable assets disposed in a predefined layout within an enclosed region, wherein the RFID reader is automatically oriented based on the predefined layout to receive tag information from each of the plurality of RFID tags; and an analytics computing apparatus communicatively coupled to the RFID reader, the analytics computing apparatus comprising a memory coupled to a processor which is configured to execute programmed instructions stored in the memory to:

segregate the tag information received from each of the plurality of RFID tags into a plurality of regions within the predefined layout based on the tag information, physical dimensions of each of the plurality of immovable assets, and a physical location of each of the plurality of immovable assets within the enclosed region;

map an RFID tag from the plurality of RFID tags to an immovable asset from the plurality of immovable assets, based on a detection count of the RFID tag at a physical location of the immovable asset and total number of detection counts for a set of RFID tags from the plurality of RFID tags, at the physical location of the immovable asset, in response to segregating the tag information, wherein based on the mapping a missing passive RFID tag or a duplicate passive RFID tag associated with a plurality of articles is detected;

verify the mapping of the RFID tag to the immovable asset based on an estimated physical location of the RFID tag and an actual physical location of the RFID tag; and display a result of the verification, the result comprising one of each of the immovable assets mapped with a single article, each of the immovable assets mapped with multiple articles, or each of the immovable assets not mapped with an article.

12. The RFID platform of claim 11, wherein the analytics computing apparatus is further configured to execute programmed instructions stored in the memory to estimate a physical location of the RFID tag based on detection counts of the RFID tag at each region within the physical dimension of the immovable asset, and physical location of each region within the physical dimension of the immovable asset.

13. The RFID platform of claim 11, wherein the analytics computing apparatus is further configured to execute programmed instructions stored in the memory to compare the physical dimension of the immovable asset with Euclidean distance between the estimated location of the RFID tag and the actual physical location of the RFID tag.

14. The RFID platform of claim 11, wherein the plurality of immovable assets comprises one of chairs, oxygen mask compartments, a lifeboat compartment, or airbag compartments.

15. The RFID platform of claim 11, wherein the plurality of articles comprises one of life vests, floats, oxygen masks, life boats, or airbags.

16. The RFID platform of claim 11, wherein the RFID reader is further configured to capture an RFID reader power at time of detecting an RFID tag and a time stamp of detection of the RFID tag while receiving the tag information, wherein the tag information received from the RFID tag comprises at least a unique ID of the RFID tag and a Received Signal Strength Indicator (RSSI) of a backscatter signal received from the RFID tag.

17. The RFID platform of claim 11, wherein the analytics computing apparatus is further configured to execute programmed instructions stored in the memory to:
   compute a probability of the RFID tag being detected at the immovable asset based on a detection count for the RFID tag on the physical location of the immovable asset and the total number of detection counts for the set of RFID tags on the physical location of the immovable asset; and
   normalize the probability by applying Baye's theorem across the plurality of immovable assets.

18. A non-transitory computer-readable storage medium having stored thereon, a set of computer-executable instructions for localizing articles comprising passive Radio Frequency Identification Device (RFID) tags causing a computer comprising one or more processors to perform steps comprising:
   receiving tag information from each of a plurality of RFID tags attached to a plurality of articles, the plurality of articles being fixed to a plurality of immovable assets disposed in a predefined layout within an enclosed region, wherein the RFID platform is automatically oriented based on the predefined layout to receive tag information from each of the plurality of RFID tags;
   segregating the tag information received from each of the plurality of RFID tags into a plurality of regions within the predefined layout based on the tag information, physical dimensions of each of the plurality of immovable assets, and a physical location of each of the plurality of immovable assets within the enclosed region;
   mapping an RFID tag from the plurality of RFID tags to an immovable asset from the plurality of immovable assets, based on a detection count of the RFID tag at a physical location of the immovable asset and total number of detection counts for a set of RFID tags from the plurality of RFID tags, at the physical location of the immovable asset, in response to segregating the tag information, wherein based on the mapping a missing passive RFID tag or a duplicate passive RFID tag associated with a plurality of articles is detected;
   verifying mapping of the RFID tag to the immovable asset based on an estimated physical location of the RFID tag and an actual physical location of the RFID tag; and
   displaying, by the RFID platform, a result of the verification, the result comprising one of each of the immovable assets mapped with a single article, each of the immovable assets mapped with multiple articles, or each of the immovable assets not mapped with an article.

* * * * *